W. DAWES.
CONVERTING MOTION.
No. 170,531. Patented Nov. 30, 1875.
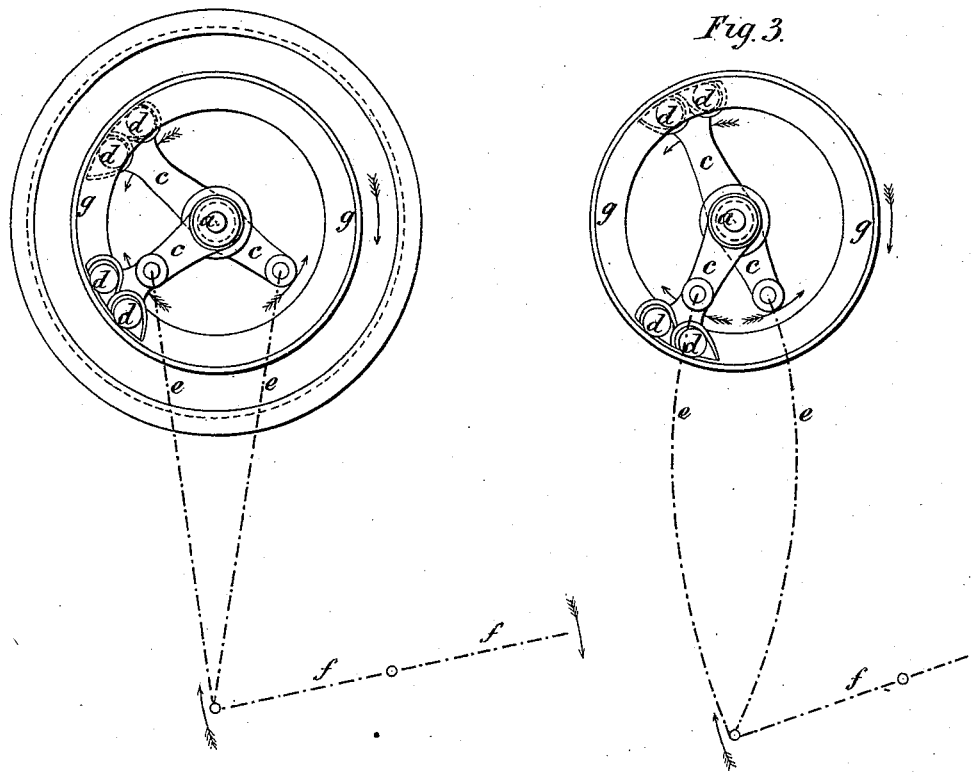

UNITED STATES PATENT OFFICE.

WILLIAM DAWES, OF LEEDS, ENGLAND.

IMPROVEMENT IN CONVERTING MOTIONS.

Specification forming part of Letters Patent No. 170,531, dated November 30, 1875; application filed September 1, 1875.

*To all whom it may concern:*

Be it known that I, WILLIAM DAWES, of Leeds, Yorkshire, England, have invented improvements in mechanism for converting reciprocating or vibratory motion into circular or revolving motion, of which the following is a specification:

My invention relates to the conversion of reciprocating or vibratory motion into circular or revolving motion, and is carried into practice as follows: Dispensing entirely with racks and pinions, pulleys and bands, and fixed back-check pawls or stops, I fit upon the center boss or barrel of the driving-wheel, or its shaft-pin, or other equivalent part of the machine to be driven or caused to revolve, one, two, or, in some cases, four levers, similar to or after the style or manner of an ordinary crank, but differing therefrom in the manner of fixing and working, this difference consisting mainly in the fact that, in lieu of being keyed upon or made fast to the said wheel, boss, or shaft, these crank-levers or pawl-levers are bored to fit, and left unkeyed or free, and furnished with a pawl motion or action for driving or propelling the said wheel or shaft the forward way only, so that (except in some cases where one crank-lever only is employed, as hereinafter explained) these levers do not revolve with the wheel or shaft, but move or oscillate backward and forward in alternate directions, their crank-pin ends and the connecting-rods which couple them to the treadles, levers, or other motors being, by preference, placed on opposite or alternate sides of the driving-wheel center, and their connecting-rods attached to or fitted to work upon one pin or center.

In those cases where it is desirable to employ one crank or pawl lever only, I prefer to use an elastic or spring connecting-rod attached firmly—that is, without joint or hinge—to the vibrating treadle or motor-lever, so that the varying angles formed by or between them during each revolution shall bend this spring connecting-rod on alternate sides from *nil* or straight, and thus cause its elasticity to give a transverse thrust, and prevent sticking on the centers, and by or through the free crank or lever (which, in this case, revolves) and its forward pawl action drive or propel the said wheel or shaft and following parts in one direction only.

The above-named elastic or spring connecting rod or rods may also, in some cases, be adopted when two or more of the pawl-levers are employed.

The pawl action employed in conjunction with the above-described pawl-levers and connecting-rods consists of elastic or semi-elastic cylinders, rollers, or balls, working or acting (as pawls) in suitable chambers or recesses at or near the ends of the before-described crank or pawl levers, which, by their bite or grip (friction) when moving upward, upon, or against suitable revolving surfaces, and the combined use of their levers and connecting-rods, and the transverse spring action, produce a continuous, steady, and safe revolving motion, however irregular or unequal the reciprocating or vibrating motive power may be.

In the accompanying drawings, which illustrate my said invention, Figure 1 is a side elevation, showing a pair of levers, each having a pair of grip cylinders or rollers. Fig. 2 is an edge way or transverse section, showing the pin, driving-wheel, and center bosses of the pawl-levers; and Fig. 3 is a side elevation nearly similar to Fig. 1, but showing the elastic or spring connecting-rods.

*a* is the said center or supporting pin. *b* is the center boss or barrel of the driving-wheel. *c c* are the pawl-levers. *d d* are the semi-elastic grip cylinders or rollers. *e e* are the connecting-rods. *f f* are motor levers or treadles. *g g* are rings or paces, against which the grip-cylinders act upward for propelling the wheel.

I claim as my invention—

1. The combination, with a wheel, of the pivoted levers *c c*, and rollers or balls *d*, operating in the manner described and shown.

2. The combination, with a wheel, of the pivoted levers *c c*, rollers or balls *d*, and elastic connecting-rods *e e*, operating in the manner described and shown.

WILLIAM DAWES.

Witnesses:
 EDWARD WHITELEY,
 JOHN LOWE,
  *Solicitor's Clerks, Leeds.*